United States Patent
Schüle et al.

(10) Patent No.: US 9,726,154 B2
(45) Date of Patent: Aug. 8, 2017

(54) STEAM POWER PLANT WITH INTEGRATED SOLAR RECEIVER

(71) Applicant: ALSTOM Technology Ltd, Baden (CH)

(72) Inventors: Volker Schüle, Leimen (DE); Fabian Bierewirtz, Mannheim (DE); Olivier Clement, Mannheim (DE)

(73) Assignee: General Electric Technology GmbH, Baden (CH)

( * ) Notice: Subject to any disclaimer, the term of this patent is extended or adjusted under 35 U.S.C. 154(b) by 92 days.

(21) Appl. No.: 14/286,080

(22) Filed: May 23, 2014

(65) Prior Publication Data

US 2015/0020526 A1  Jan. 22, 2015

Related U.S. Application Data

(63) Continuation of application No. PCT/IB2012/057845, filed on Dec. 31, 2012.

(30) Foreign Application Priority Data

Dec. 30, 2011  (EP) ..................... 11196212

(51) Int. Cl.
*F03G 6/00* (2006.01)
*F24J 2/07* (2006.01)
*F03G 6/06* (2006.01)
*F22B 1/00* (2006.01)
*F24J 2/12* (2006.01)
(Continued)

(52) U.S. Cl.
CPC ............. *F03G 6/003* (2013.01); *F03G 6/065* (2013.01); *F22B 1/006* (2013.01); *F24J 2/07* (2013.01); *F24J 2/12* (2013.01); *F24J 2/4609* (2013.01); *F24J 2/5417* (2013.01); *F24J 2/5266* (2013.01); *F24J 2002/1076* (2013.01); *Y02E 10/41* (2013.01); *Y02E 10/42* (2013.01);
(Continued)

(58) Field of Classification Search
CPC .... F03G 6/003; F03G 6/065; F24J 2/12; F24J 2/07; F24J 2/5417; F24J 2/4609; F24J 2/5266; F24J 2002/1076; F22B 1/006; Y02E 10/42; Y02E 10/41; Y02E 10/47; Y02E 20/16; Y02E 10/46
USPC .................. 60/641.8–641.15, 653, 677–680; 126/600–608

See application file for complete search history.

(56) References Cited

U.S. PATENT DOCUMENTS 4,438,630 A * 3/1984 Rowe ........................ F01K 3/18
                                                          60/641.8
5,419,135 A   5/1995 Wiggs
(Continued)

FOREIGN PATENT DOCUMENTS

DE      10248068 A1    5/2004
ES     2 323 355 A1    7/2009
(Continued)

OTHER PUBLICATIONS

Unofficial English Translation of Office Action issued in connection with corresponding CL Application No. 1725-2014 on Feb. 10, 2017.

*Primary Examiner* — Hoang Nguyen
(74) *Attorney, Agent, or Firm* — GE Global Patent Operation; Cynthia W. Flanigan

(57) ABSTRACT

A hybrid steam power plant is disclosed using the steam generator as a sub-construction for a solar receiver.

12 Claims, 11 Drawing Sheets

(51) Int. Cl.
*F24J 2/46* (2006.01)
*F24J 2/54* (2006.01)
*F24J 2/52* (2006.01)
*F24J 2/10* (2006.01)

(52) U.S. Cl.
CPC ............... *Y02E 10/46* (2013.01); *Y02E 10/47* (2013.01); *Y02E 20/16* (2013.01)

(56) References Cited

U.S. PATENT DOCUMENTS

| | | |
|---|---|---|
| 8,572,968 B2 | 11/2013 | Schaal |
| 2009/0260359 A1 | 10/2009 | Palkes |
| 2009/0260622 A1 | 10/2009 | Palkes et al. |
| 2010/0089060 A1* | 4/2010 | Ferguson ............... F03G 7/04 60/653 |
| 2010/0242474 A1* | 9/2010 | Berger ............... F01K 25/10 60/641.2 |
| 2010/0313875 A1* | 12/2010 | Kennedy ............... F24J 2/055 126/652 |
| 2012/0031094 A1* | 2/2012 | de Bruijn ............... F03G 6/065 60/641.11 |
| 2013/0091842 A1* | 4/2013 | Kaufmann ............... F01K 13/02 60/641.8 |
| 2013/0192226 A1* | 8/2013 | Stettenheim ............... F24J 2/055 60/641.15 |

FOREIGN PATENT DOCUMENTS

| | | |
|---|---|---|
| FR | 920510 A | 4/1947 |
| JP | H08-189457 A | 7/1996 |
| WO | 96/31697 | 10/1996 |
| WO | 9714887 A1 | 4/1997 |
| WO | 2007/093464 A1 | 8/2007 |
| WO | 2009/062103 A1 | 5/2009 |
| WO | 2009/129167 A2 | 10/2009 |
| WO | 2010/001217 A1 | 1/2010 |
| WO | 2010/093235 A2 | 8/2010 |
| WO | 2011/044356 A1 | 4/2011 |
| WO | 2011/067434 A2 | 6/2011 |
| WO | 2011/140021 A1 | 11/2011 |

\* cited by examiner

STEAM POWER PLANT WITH INTEGRATED SOLAR RECEIVER

CROSS-REFERENCE TO RELATED APPLICATIONS

This application claims priority to PCT/IB2012/057845 filed Dec. 31, 2012, which claims priority to European application 11196212.2 filed Dec. 30, 2011, both of which are hereby incorporated in their entireties.

BACKGROUND

Existing hybrid power plants with fossil fuelled steam generators and solar collectors use concentrating solar receivers to convert solar radiation into thermal energy and either convert it directly into electrical energy or for the support of fossil fired power plants.

Collector fields with concentrating solar power plants, comprising solar collectors and receivers, need a lot of free space, which has to be plain and adjacent to the turbine of the steam power plant.

Conventional concentrating solar power plants have high initial investment costs for the solar collectors, the receiver and the high pressure piping. This investment is required for any size of the plant. Therefore a minimum size of the power plant is required to make the project financial viable.

SUMMARY

It is an object of the invention, to reduce the initial investment required for erecting a solar power plant that may support a fossil fuelled steam power plant.

One aspect of the claimed invention is that the steam generator of a conventional fossil fuelled steam power plant is rather high and may serve as under construction for the receiver of a concentrating solar power plant. Due to this double function of the conventional steam generator the costs for the receiver may be strongly reduced.

It is also possible to use the already existing water walls of the steam generator either in the vaporisator, and/or a (evaporator) superheater and/or a resuperheater as receiving surface for solar radiation that is concentrated by means of the solar collectors.

Doing so, it is not even necessary to erect a separate solar receiver and the connecting conduits that connect the receiver with the water steam circuit of the steam power plant.

To realize this embodiment of the claimed invention, namely to integrate the solar receiver in the steam generator itself, it is only necessary to open the housing of the steam generator to allow the collected solar radiation to reach the water wall inside the housing. Of course, it may in some cases be necessary to raise the thickness of the water wall at the area, where solar radiation is received, and/or to alter the material of the water walls at these areas.

Since the water wall of a steam generator have a rather huge area, it is not necessary to strongly focus the solar radiation of all solar collectors. Strongly focusing the solar radiation would result in a very high specific thermal power [kW/m$^2$], which is not necessary at this stage of steam generation. The higher the specific thermal power the higher is the thermal and mechanical stress to the water walls.

If, for example, an area of five meter square (5 m$^2$) of the water wall is prepared for receiving solar radiation from 100 solar collectors, the solar radiation of these 100 collectors can be distributed over the whole receiving area. Such a huge receiving area were not acceptable for "conventional" solar receivers.

It is preferred, if the solar radiation produces slightly superheated steam in the receiver to avoid erosive damage to the piping and armatures.

Further advantages and advantageous embodiments of the invention can be taken from the following drawing, its specification and the patent claims. All features described in the drawing, its specification and the patent claims can be relevant for the invention either taken by themselves or in optional combination with each other.

BRIEF DESCRIPTION OF THE DRAWINGS

Referring now to the Figures, which are exemplary embodiments, and wherein the like elements are numbered alike.

DETAILED DESCRIPTION

Figure 1:
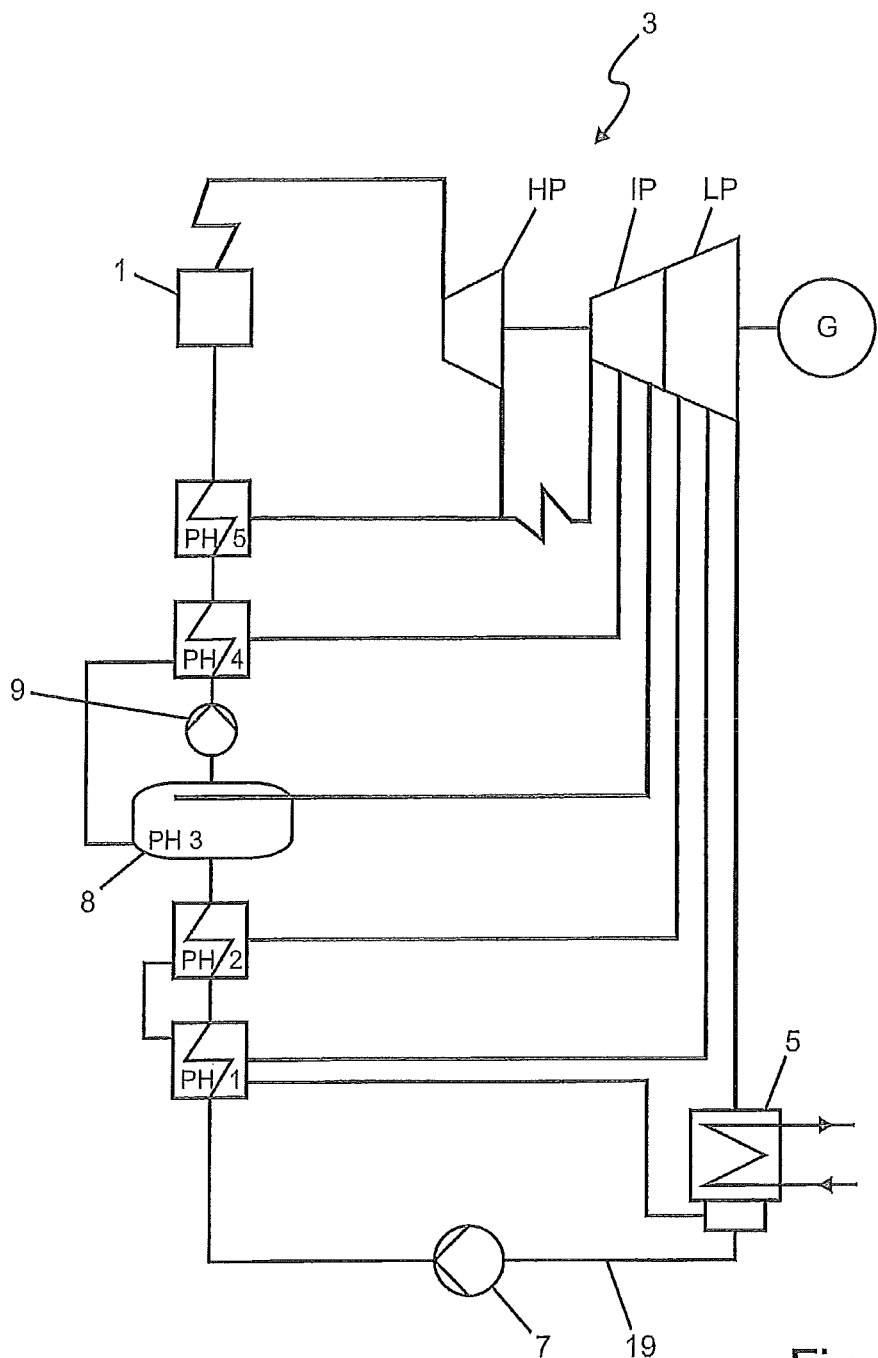
FIG. 1 is a schematic diagram of a steam power plant illustrative of known prior art.

In FIG. 1 a steam power plant fuelled with fossils or biomass is represented as block diagram. FIG. 1 essentially has the purpose of designating the single components of the power plant and to represent the water-steam-cycle in its entirety. For reasons of clarity in the following figures only those parts of the water-steam-cycle are represented which are essential to the invention.

In a steam generator 1 under utilization of fossil fuels or by means of biomass out of the feed water live steam is generated, which is expanded in a steam turbine 3 and thus drives a generator G. Turbine 3 can be separated into a high-pressure part HP, an intermediate-pressure part IP and a low-pressure part LP.

After expanding the steam in turbine 3, it streams into a condenser 5 and is liquefied there. For this purpose a generally liquid cooling medium, as e. g. cooling water, is supplied to condenser 5. This cooling water is then cooled in a cooling tower (not shown) or by a river in the vicinity of the power plant (not shown), before it enters into condenser 5.

The condensate originated in condenser 5 is then supplied, by a condensate pump 7, to several preheaters PH1 to PH5. In the shown embodiment behind the second preheater PH2 a feed water container 8 is arranged and behind the feed water container 8 a feed water pump 9 is provided.

In combination with the invention it is of significance that the condensate from condenser 5 is preheated with steam beginning with the first preheater PH1 until the last preheater PH5. This so-called tapping steam is taken from turbine 3 and leads to a diminution of the output of turbine 3. With the heat exchange between tapping steam and condensate the temperature of the condensate increases from preheater to preheater. Consequently the temperature as well of the steam utilized for preheating must increase from preheater to preheater.

In the shown embodiment the preheaters PH1 and PH2 are heated with steam from low-pressure part LP of steam turbine 3, whereas the last preheater PH5 is partially heated with steam from high-pressure part HP of steam turbine 3. The third preheater PH3 arranged in the feed water container 8 is heated with steam from Intermediate-pressure part IP of turbine 3.

In FIGS. 2A-2E, 3 and 4 various embodiments and methods of operating a steam power plant according to the invention are illustrated. As the invention essentially is concerned with the steam generator 1 and the turbine 3 only this part of the steam power plant is shown in FIGS. 2A-2E. Neither are, for reasons of clarity, all fittings and components shown or designated with reference numerals.

The steam generator 1 that is illustrated in FIG. 1 as a single black box is illustrated in FIGS. 2A-2E, 3 and 4 in more detail. The housing of the steam generator, which comprises also the supporting structure, bears the reference number 10 Inside the housing the main components of the steam generator 1 are illustrated.

Following the feed water or condensate coming from the preheater PH5 it enters the steam generator 1 and passes an economizer 11, a vaporizator 13, a separator 15, several super heaters SH1, SH2, SH3 and reheaters RH1, RH2. In the vaporizator 13 the condensate is heated and becomes saturated steam. In the separator 15 liquid particles are separated from the saturated steam and fed into the condensate line 19 before the vaporizator 13.

Figure 2A:
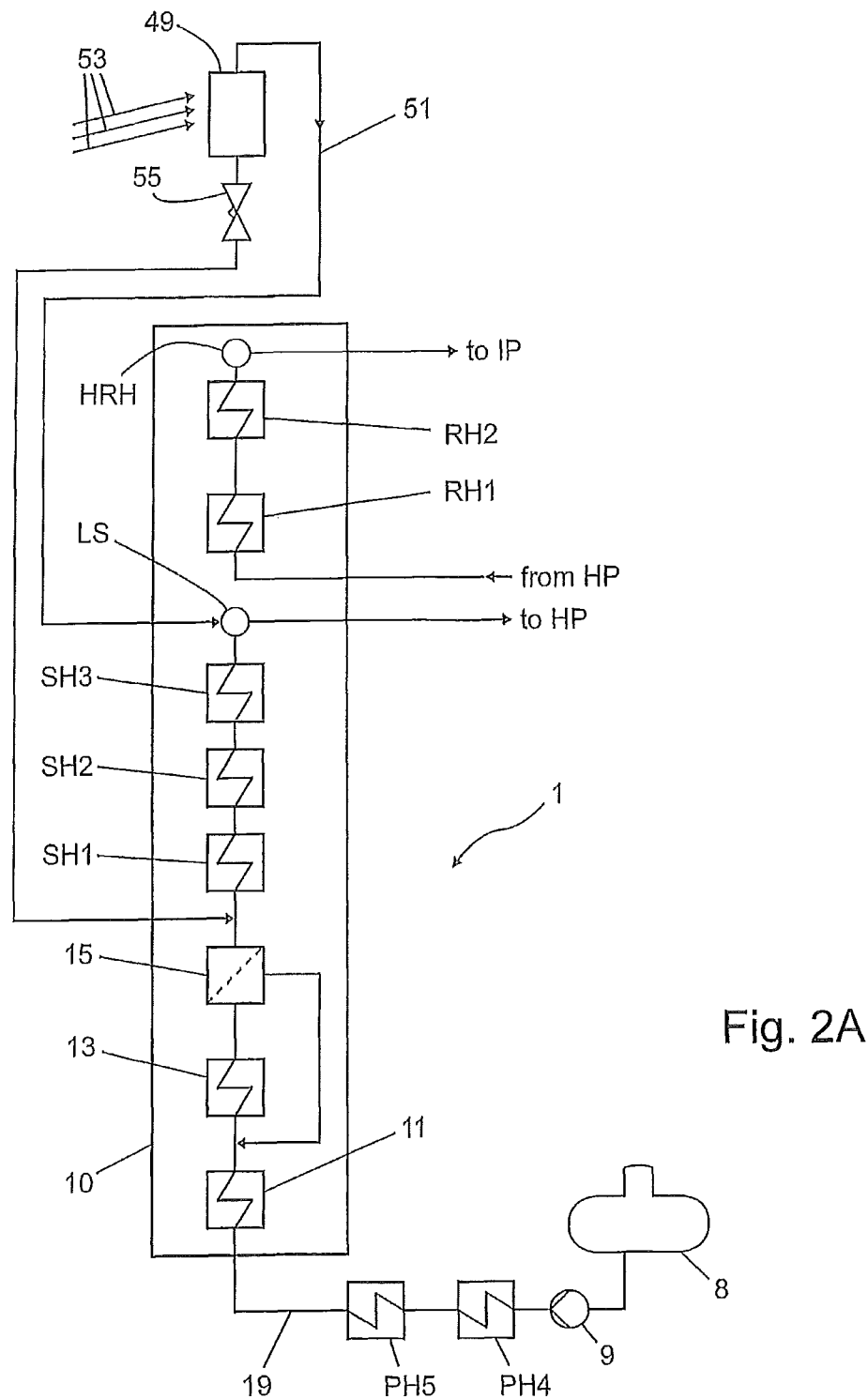
FIG. 2A is a schematic diagram of a first embodiment of a steam power plant including a solar receiver in accordance with the present invention.

The live steam that leaves the last superheaters SH is abbreviated with the letters LS. In FIG. 2A to a circle with the reference LS can be seen. At this point the parameters of the live steam LS, namely a pressure $p_{LS}$ and temperature $T_{LS}$, occur and can be measured by means of appropriate sensors (not shown). The life steam LS enters the high-pressure part HP of the turbine 3 (not shown in FIG. 2A), expands partially and cools down and re-enters the steam generator 1.

The steam after having passed the high pressure part HP of the turbine 3 has a reduced temperature and pressure and enters the reheaters RH1 and RH2 in the steam generator 1. This reheated steam HRH (hot reheat) enters the intermediate pressure part IP of the turbine 3. The circle HRH in FIG. 2A illustrates a place where this hot reheated steam HRH occurs. The corresponding steam parameters (temperature and pressure) may be detected by a temperature sensor and/or a pressure sensor at this point, if desired.

On top of the housing 10 a solar receiver 49 is installed. A solar receiver 49 receives solar radiation from at least one or preferably several solar collectors (not shown in FIG. 2) if the sun is shining. The solar radiation is illustrated by the arrows 53.

The piping that connects the receiver 49 to the water-steam circuit of the steam power plant is very short and simple. It comprises a connecting conduit 51 and a control valve 55.

In case no solar radiation 53 reaches the receiver 49 the control valve 55 is shut, so that no steam flows through the receiver 49 and the heat losses are minimised.

In FIG. 2A the receiver 49 is connected in parallel to the superheaters SH1, SH2 and SH3.

Figure 2B:
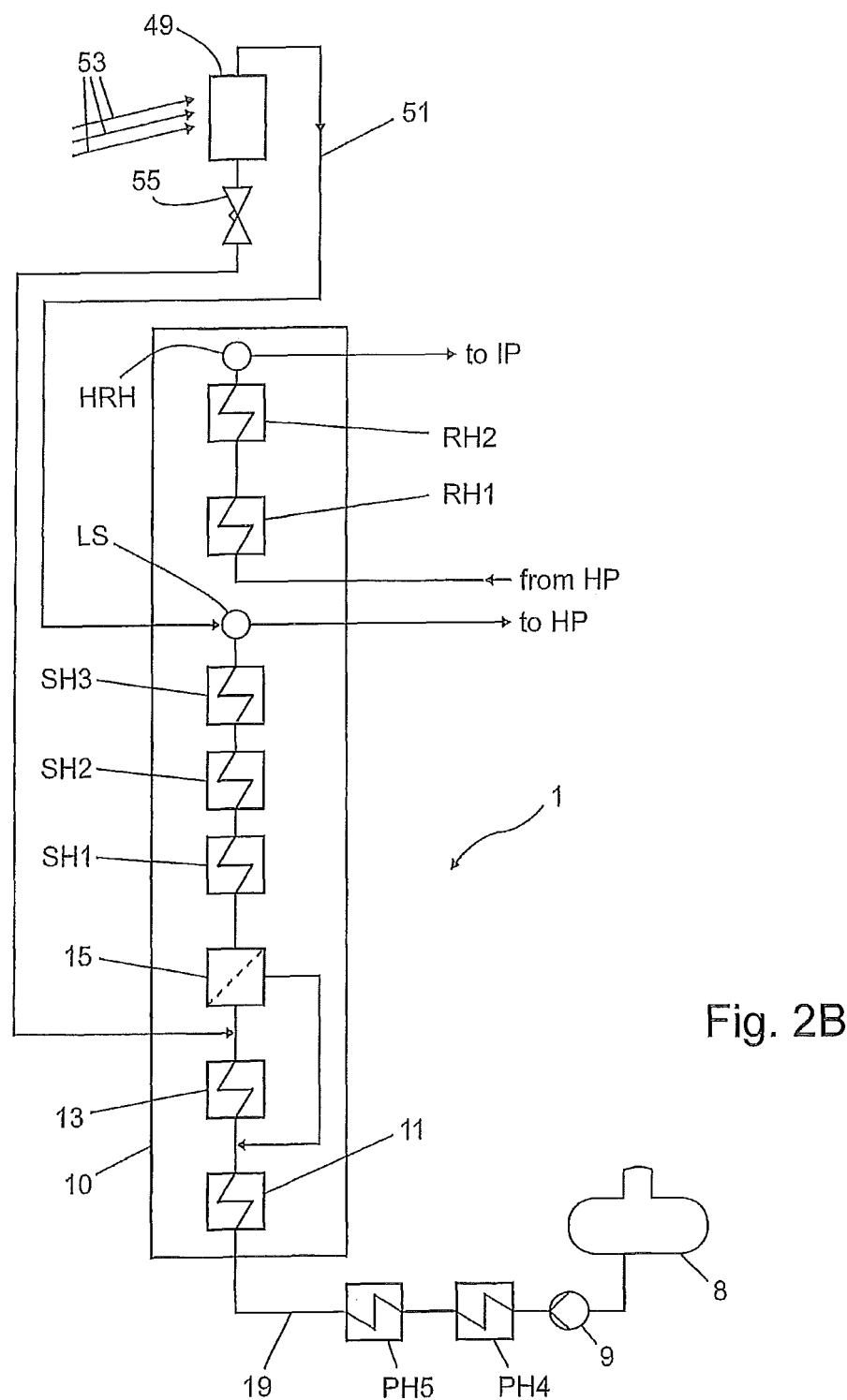
FIG. 2B is a schematic diagram of a second embodiment of a steam power plant including a solar receiver in accordance with the present invention.

In FIG. 2B the receiver 49 is connected in parallel to the economizer 11 and the vaporizator 13.

Figure 2C:
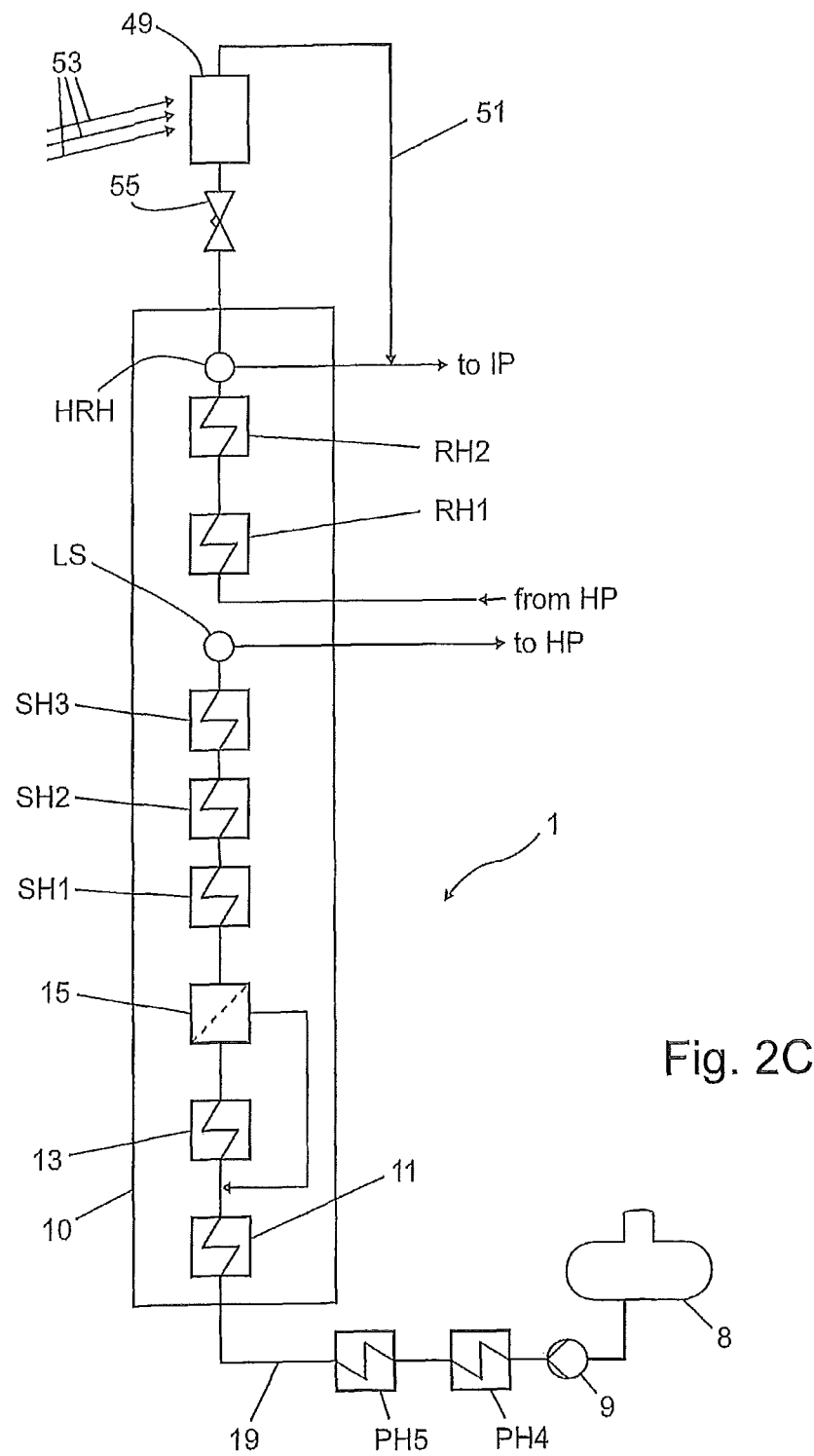
FIG. 2C is a schematic diagram of a third embodiment of a steam power plant including a solar receiver in accordance with the present invention.

In FIG. 2C the receiver 49 is supplied with steam from the high pressure part HP of the turbine 3 and is connected downstream of the last reheater RH2 before entering the intermediate pressure part IP of the turbine 3.

Figure 2D:
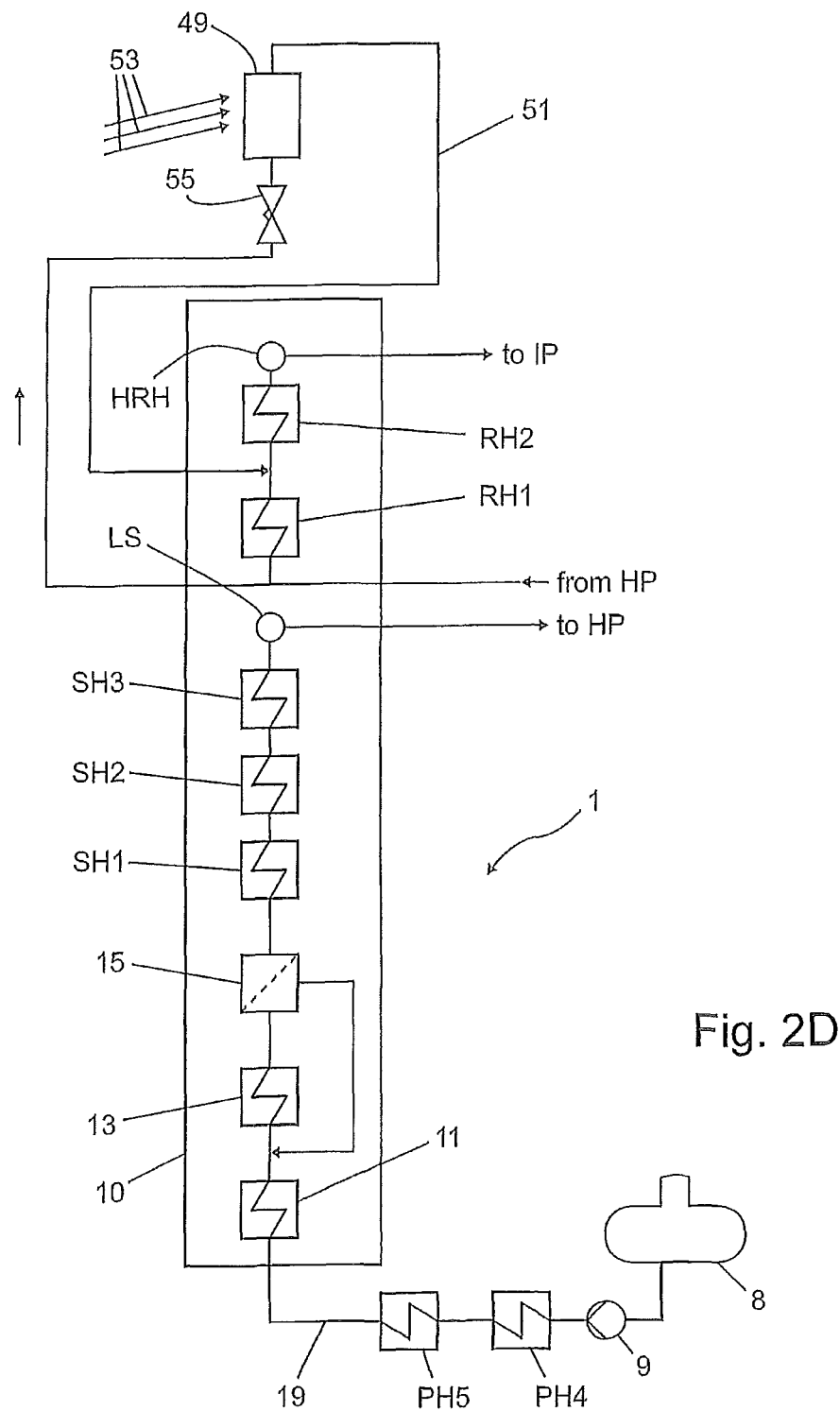
FIG. 2D is a schematic diagram of a fourth embodiment of a steam power plant including a solar receiver in accordance with the present invention.

In FIG. 2D the receiver 49 is supplied with steam form the high pressure part HP of the turbine 3 and is connected upstream of the last reheater RH2.

Figure 2E:
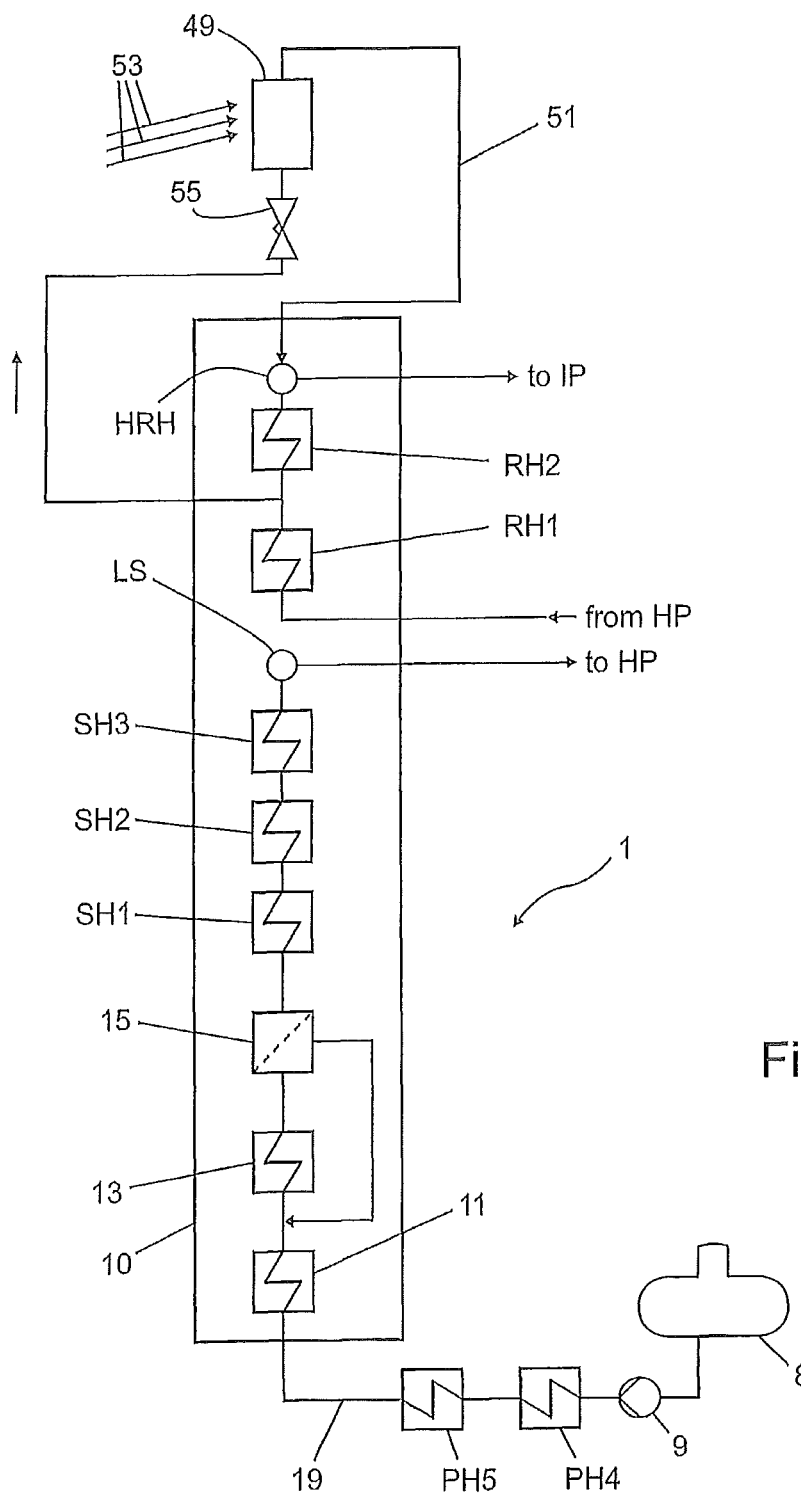
FIG. 2E is a schematic diagram of a fifth embodiment of a steam power plant including a solar receiver in accordance with the present invention.

In FIG. 2E the receiver 49 is connected in parallel to the last reheater RH2.

The major difference between the variations of FIGS. 2A-2F are the temperatures inside the water-steam-circuit. Consequently the operating temperature of the receiver 49 is different, too. This allows to optimise the contribution of the receiver 49 depending on the specific conditions of the steam power plant.

Of course it is possible to combine the embodiments disclosed in FIGS. 2A-2C in one power plant station. This leads to a bit more complex piping and requires more valves. The result is an even higher contribution of the receiver 49 to the steam generation.

The illustration of FIGS. 2A, 2B and 2C illustrates very clearly some major advantages of this design:

No tower for the receiver 49 is necessary, since the housing 10 of the steam generator 1 overtakes this function.

The piping 51 for connecting the receiver with the steam-water-circuit of the steam power plant is very simple.

No extra space is needed for the solar receiver.

These advantages greatly contribute to reducing the costs for installing and integrating a solar receiver 49 into a fossil fuelled steam power plant.

Figure 3:
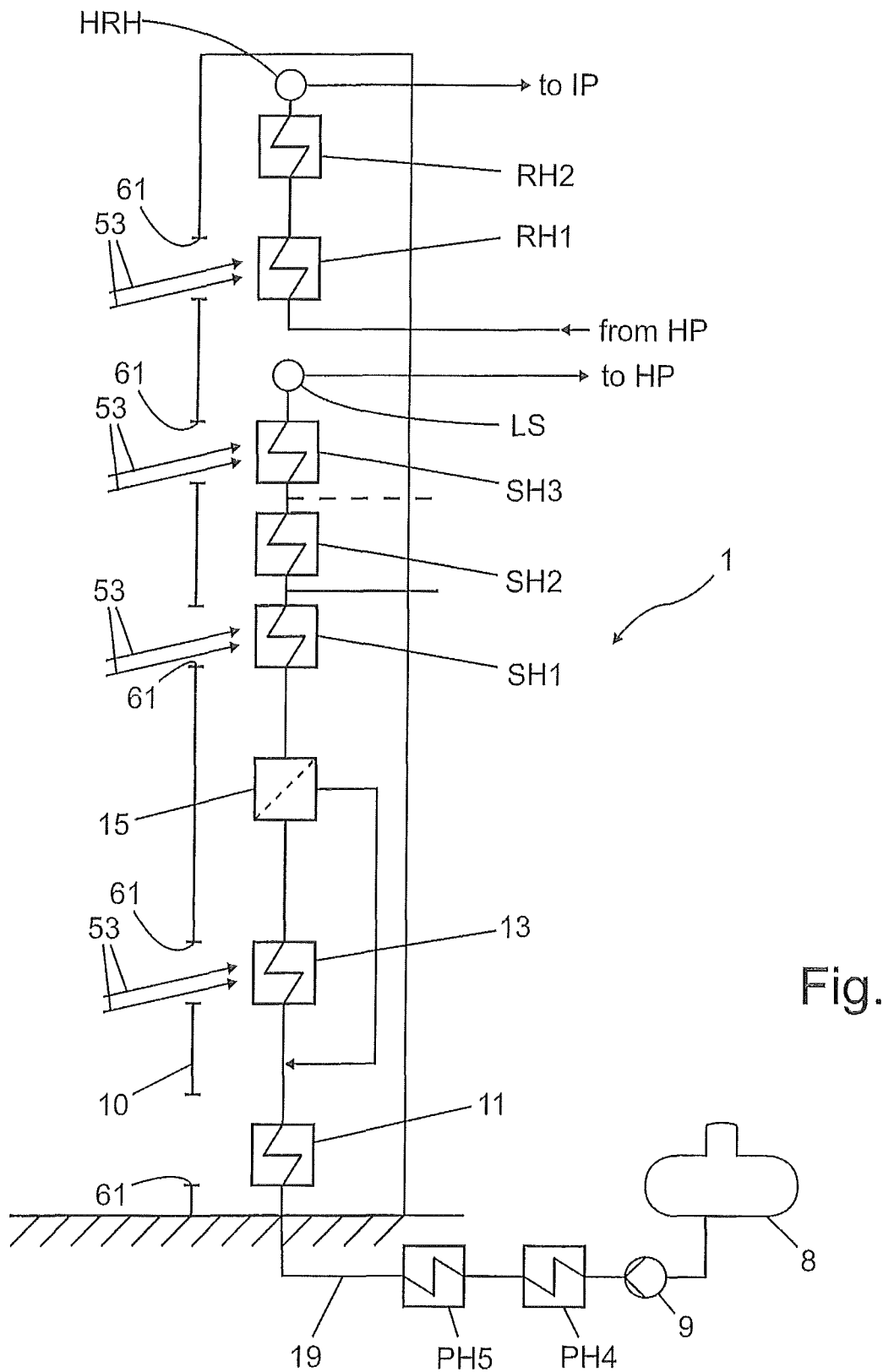
FIG. 3 is a is schematic diagram of another embodiment of a steam power plant having integrated solar radiation into the steam generating process in accordance with the present invention.

FIG. 3 shows a second embodiment of the claimed integration of a solar radiation into the steam generating process.

In this embodiment some of the components of the steam generator have a double function: They transfer heat from the flue gas to the steam-water-circuit and they transfer solar radiation 53 to the steam-water-circuit.

To make the transfer from solar radiation 53 to the water-steam-circuit possible the housing 10 has to comprise at least one opening 61 so that the solar radiation may be directed to the water walls of the economizer 11, the vaporizator 13, the separator 15, several super heaters SH1, SH2, SH3 and/or reheaters RH1, RH2.

In case enough solar radiation 53 is available from several collectors (not shown) more than one opening 61 is open and thus the solar radiation 53 can be transferred into the water-steam circuit at different components inside the steam generator 1.

In case only little solar radiation 53 is available only one opening 61 is open and the solar radiation collected with several collectors is focused/concentrated for example to one of the outer surfaces of the economizer 11, the vaporizator 13, the separator 15, several super heaters SH1, SH2, SH3 or reheaters RH1, RH2.

The amendments necessary at the water walls are rather small, since they are made of a material that may stand high thermal loads and stress. In some cases the thickness of the water walls may be raised at least partially where solar radiation 53 may be directed to.

To reduce heat losses the openings 61 may be closed in case no solar radiation 53 is available.

This embodiment is even more simple than the first embodiment. With regard to the water-steam-circuit since no amendments are necessary.

Figure 4:
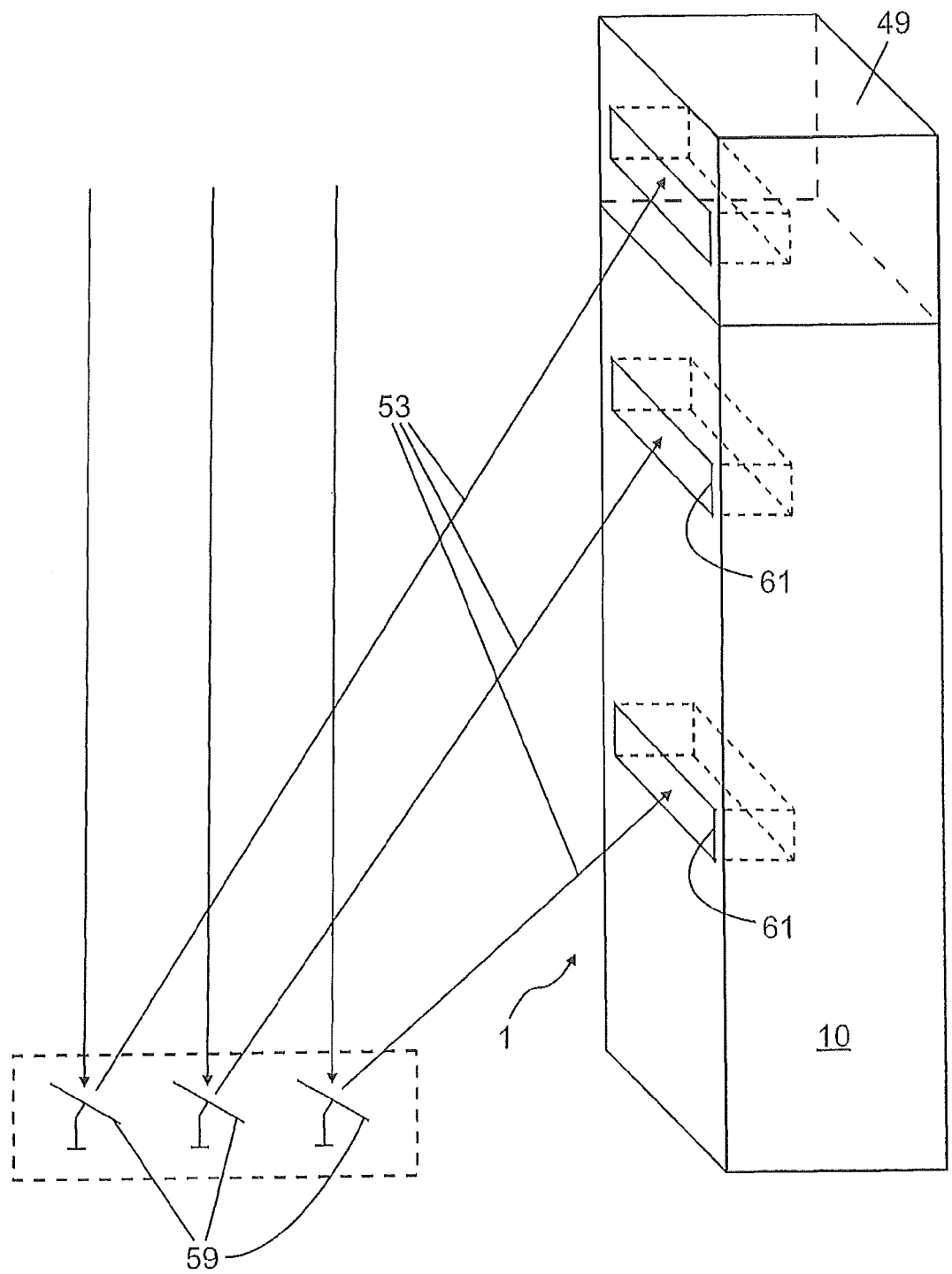
FIG. 4 is a perspective view of another embodiment of a steam power plant having a housing of a steam generator and a solar receiver integrated with solar collectors in accordance with the present invention.

Of course, it is possible to combine the embodiments illustrated in FIGS. 2A-2E and 3 resulting in a steam power plant comprising a solar receiver 49 preferably on top of the housing 10 and several opening 61 in the housing to allow the direct or "integrated" heat transfer by means of the walls of the economizer 11, the evaporator 13, the separator 15, the superheaters SH1, SH2, SH3 and/or the reheaters RH1, RH2. This embodiment is illustrated in FIG. 4.

Figure 5A:
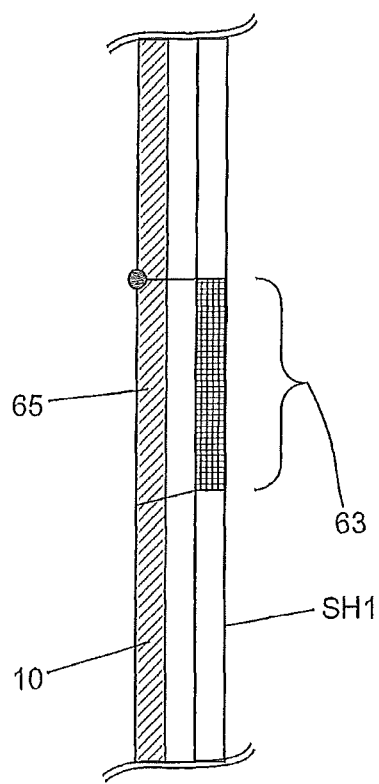
FIGS. 5A and 5B is a cross-sectional view of a closing mechanism integrated in the housing of a steam generator in accordance with the present invention.
Figure 5B:
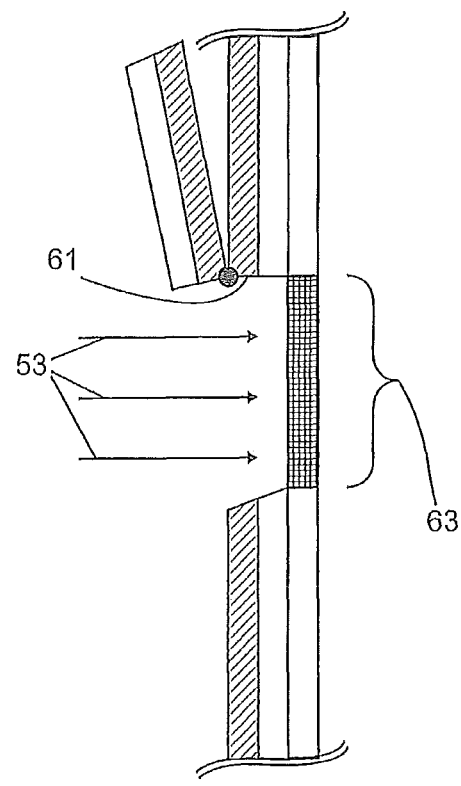

FIGS. 5A and 5B shows a closing mechanism 65 integrated in the housing 10 of a steam generator 1. In the left part of FIGS. 5A and 5B the closing mechanism 65 is closed and consequently the heat losses from inside the steam generator for example are minimized.

As an example behind the closing mechanism 65 of the housing 10 the water wall of a superheater SH1 is mounted. Directly behind the closing mechanism 65 an area 63 prepared for receiving solar radiation is illustrated as a hedged area. This hedged area may comprise a thicker water wall and/or coatings that raise absorption of solar radiation.

In case the solar connectors are working the closing mechanism 65 is opened and consequently an opening 61 in the housing 10 is opened. Consequently the solar radiation 53 that has been collected from the solar collectors (not shown) and focussed to the area 63 of the superheater SH1 passes the housing 10 of the steam generator and is being absorbed on the surface of the water wall of the super heater SH1 especially the area 63.

Figure 6:
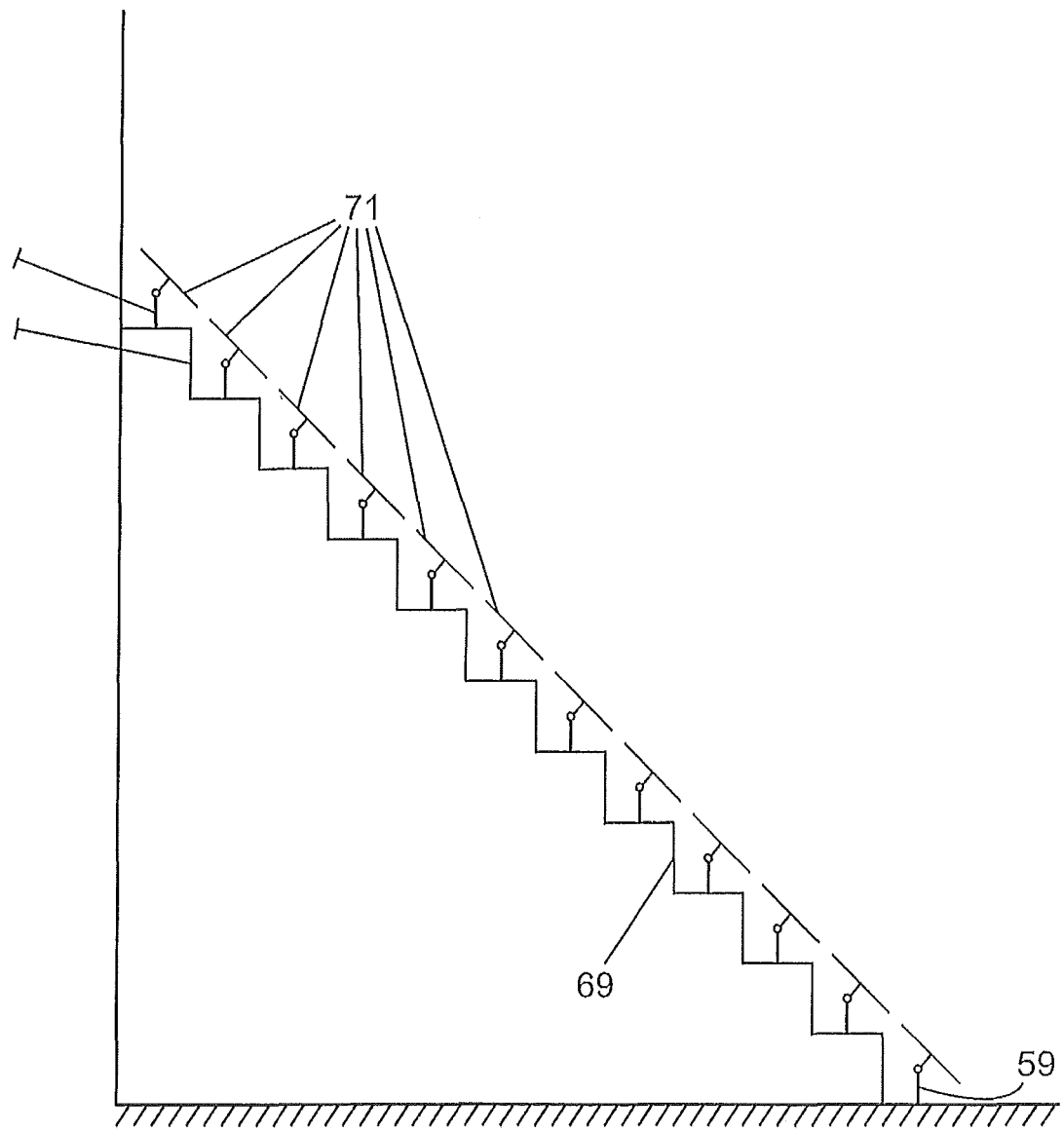
FIG. 6 is a side elevation view of an arrangement of solar collectors in accordance with the present invention.
Figure 7:
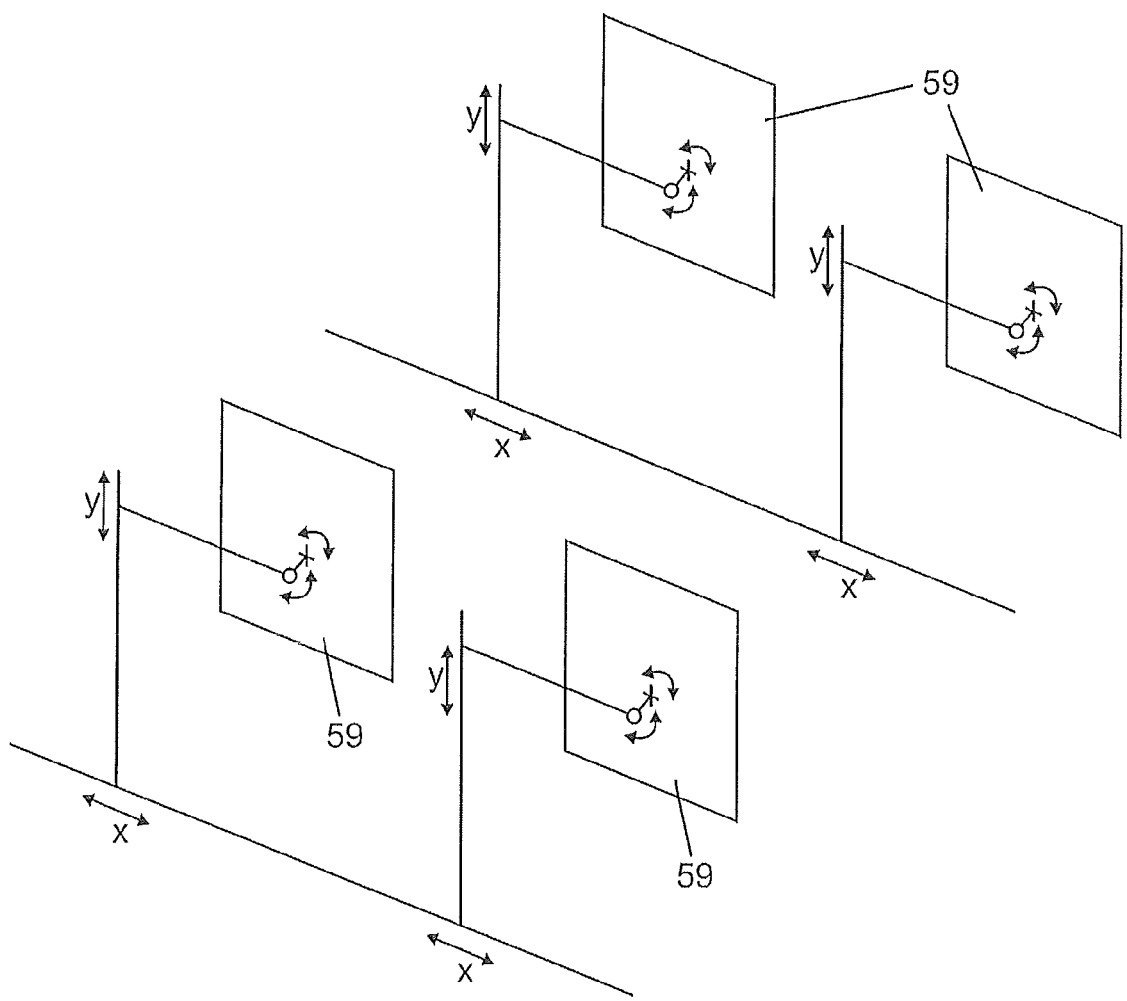
FIG. 7 is a side elevation view of another arrangement of solar collectors in accordance with the present invention.

In FIGS. 6 and 7 two arrangements of solar collectors 59 are illustrated. The solar collectors 59 are of a conventional design that means that the collecting surface of these solar collectors can be turned and tilted in two direction allowing to direct the solar radiation 53 to the receiver 49 and/or the openings 61 in the housing of the steam generator 1.

Since in conventional steam power plants often other buildings (not shown) make it impossible to collect the solar radiation and direct it to the solar receiver 49 and/or the openings 61 in the steam generator 1 if the solar collectors 59 are mounted on the ground directly. For this reason, in FIG. 6 a staggered sub-construction between the ground and the solar collectors 59 is illustrated. This staggered sub-construction 69 allows in several cases to better collect and direct the collected solar radiation to the solar receiver or to the openings to the steam generator 1.

Second possibility to enlarge the contribution of solar radiation to the steam generation is shown in FIG. 7. In this embodiment the solar collectors 59 are not only turnable and tiltable about one or two axis of rotation, but are slidably mounted along a first x-axis or a second axis (y-axis). The first and the second axis are preferably orthogonal to each other, thus allowing to change the position of the solar collectors 59 depending within a wide range. This allows the movement of the solar collectors 59 depending on the position of the sun and the position of buildings or other things between the solar collectors 59 and the solar receiver 49 or the opening 61 in the steam generator 1.

The invention claimed is:

1. A steam power plant comprising:
   a fossil fuelled steam generator;
   a turbine;
   a condenser;
   at least one solar collector;
   a receiver for receiving solar radiation collected by the at least one solar collector and for generating steam by utilization of the solar radiation, wherein the receiver is mounted on or integrated in the fossil fuelled steam generator;
   a conduit for combining steam generated by the fossil fuelled steam generator and the steam generated by the receiver and for providing the combined steam to the turbine; and
   at least one opening in a housing of the fossil fuelled steam generator for directing the solar radiation to water walls of an economizer, a vaporizator, a separator, super heaters and/or reheaters.

2. The steam power plant according to claim 1, wherein the receiver is mounted on top of a housing of the fossil fuelled steam generator.

3. The steam power plant according to claim 1, wherein the receiver is connected to an existing water steam cycle by a steam conduit between the fossil fuelled steam generator and the turbine.

4. The steam power plant according to claim 1, wherein reflecting surfaces of the at least one solar collector are aligned to a paraboloid when directed to the receiver.

5. The steam power plant according to claim 1, wherein the at least one solar collector is mounted on a staggered framework.

6. The steam power plant according to claim 1, wherein the at least one solar collector is slideably mounted.

7. The steam power plant according to claim 4, wherein the at least one solar collector is slideably mounted in the direction of a first axis and/or slideably mounted in the direction of a second axis.

8. The steam power plant according to claim 1, wherein a receiving surface of the receiver is coated to reduce thermal losses.

9. The steam power plant according to claim 8, wherein the receiving surface of the receiver is coated with a ceramic multilayer coating, based on TiAlN, to reduce thermal losses.

10. The steam power plant according to claim 8, wherein the coating of the receiving surface of the receiver is deposited through PVD or PEVD processes.

11. The steam power plant according to claim 1, wherein the receiver is connected in parallel to at least one existing heater of the fossil fuelled steam generator.

12. The steam power plant according to claim 1, wherein the receiver is connected in parallel to an existing vaporizer or economizer of the fossil fuelled steam generator.

* * * * *